Aug. 14, 1962     E. J. WHITMAN ETAL     3,048,924
DENTAL MIRROR HANDLE
Filed May 4, 1960

*INVENTORS*
*LOREN F. WEISS &*
BY *EDWIN J. WHITMAN*

*Fay & Fay*
ATTORNEYS

3,048,924
DENTAL MIRROR HANDLE
Edwin J. Whitman, 3703 Riedham Road, and Loren F. Weiss, 3660 Riedham Road, both of Cleveland, Ohio
Filed May 4, 1960, Ser. No. 26,769
3 Claims. (Cl. 32—69)

This invention relates to a dental mirror and particularly to an anti-fogging dental mirror. Generally in connection with dental mirrors and the many improvements made thereon a problem exists in maintaining the reflecting surface of the mirror clean and free from fogging and moisture condensation during the drilling process. This problem has been emphasized recently by the use of high-speed drills which employ water or vapor spray cooling. In this connection, when working on the upper teeth or the sides of the lower teeth, it is almost impossible to get a sufficiently long working interval for efficient use. The surface of the mirror being utilized is constantly fogging up, and the dentist of necessity must stop to clean the mirror before proceeding with his work.

This invention is particularly in a combination dental mirror wherein the handle itself is an air conduit. It is a simple hollow, tubular column suitably narrowed for the gripping surface, and, thus, the handle combines with the air conduit and fan-shaped nozzle for the purpose of spraying a blast of air at relatively low pressure on the mirror reflecting surface.

In general, this invention comprises a standard dental mirror having a reflecting surface and frame and a shank portion extending from the frame and reflecting surface a short distance; a hollow tubular member with a reduced end portion for a standard plastic air pressure hose; a pair of right angled bends for offsetting the tubular handle; and a fan-shaped nozzle end. The shank of the mirror has a reduced end portion and fits through an opening in the offset portion, and then threadingly fastened thereto. The air passes through the reduced end section, through the hollow tubular member and around the mirror shank in the offset portion to a fan-shaped nozzle directly above, i.e. in front of, and substantially parallel to the surface of the mirror in order to clean the mirror of moisture while it is being used.

An object of this invention is to provide a new and improved anti-fogging dental mirror comprising a minimum of special components and using standard dental mirrors and shank portions which may be easily sterilized.

A further object of this invention is to provide a new and improved combination dental mirror and handle in which air passes at a slight angle to the surface of the mirror in order to clean the mirror during usage.

To the accomplishment of the foregoing and related ends, said invention then consists of the means hereinafter fully described and particularly pointed out in the claims; the following description setting forth in detail one approved means of carrying out the invention, such disclosed means, however, constituting but one of the various ways in which the principles of the invention may be used.

Figure 1:
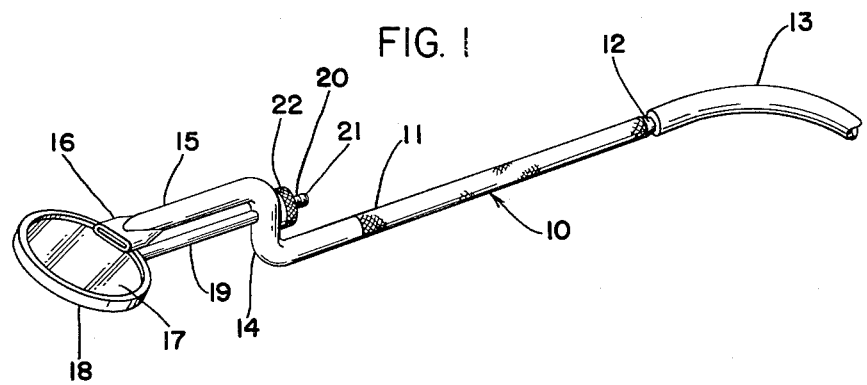
FIG. 1 is a perspective view of our new and improved invention.
Figure 2:
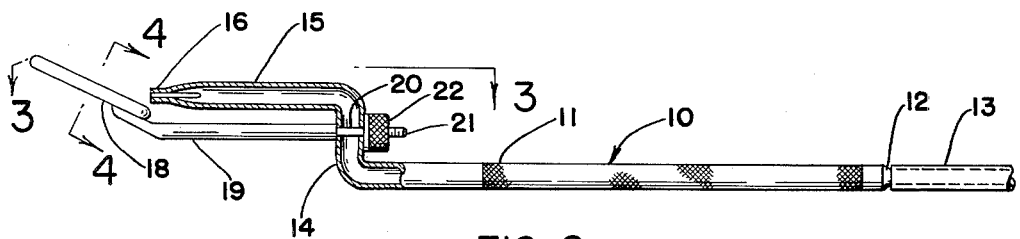
FIG. 2 is an elevation with parts broken away.
Figure 3:
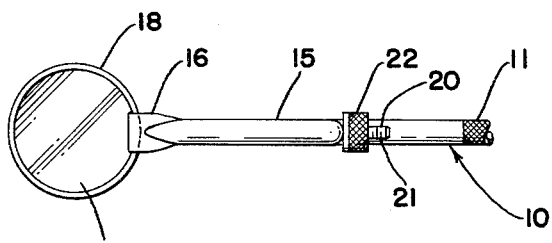
FIG. 3 is a fragmentary view of the dental mirror air conduit handle along the line 3—3 of FIG. 2.
Figure 4:
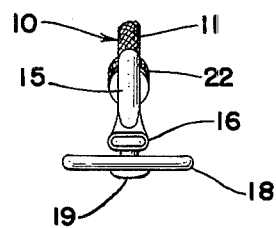
FIG. 4 is an end view along the line 4—4 of FIG. 2.

Referring now more particularly to the drawings, 10 shows the tubular handle having a knurled section for easy gripping at 11 and a reduced end portion 12 adapted for the standard plastic tubing used in connection with air and vacuum in dental offices, said tubing being shown at 13. The mirror mounting section has an offset portion forming a right angled bend at 14 which acts as a cheek retractor to separate the cheek from adjacent teeth and thereby to provide increased working area, and a further offset portion 15, and this latter portion is substantially parallel to the original portion. At the end of the tubing is a fan-shaped nozzle 16 which terminates directly in front of the reflecting surface of the mirror 17 and which may be bent or angulated at various directions to improve the flow of air over the reflecting surface of the mirror at 17. Around the edge of the mirror is a frame structure 18 and attached to this frame structure is a shank portion 19 which has a reduced end section as at 20 with a threaded portion 21 to which a screw fastening means 22 may be secured.

The particular advantages of this dental mirror-handle combination are: it is made of simple components and readily fabricated; it uses a simple hollow, tubular conduit handle; it provides a cheek retractor surface which spreads the cheek from the adjacent teeth to provide an increased working area; it uses the standard air pressure that is available for use in dental offices and plastic hoses connected to the end section; it uses a standard mirror reflecting surface frame and shank portion which may be readily separated and sterilized after each usage; and it is possible to use the tubular conduit over and over and insert a new mirror for each patient easily.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

We claim:

1. In an anti-fogging dental mirror adapted to reduce the moisture condensation in the mouth and provide increased working area by retracting the cheek, a dental mirror having a frame and reflecting surface, a shank portion connected to said frame, an integral tubular handle and conduit having a pair of substantially co-planar right angled bends forming an offset portion to said conduit which terminates directly in front of the reflecting surface and provides a smooth curved surface for retracting the cheek away from the teeth for increased working area, an opening in the conduit between said right angled bends, said shank portion mounted through said conduit opening and tightly secured thereto in alignment with the conduit, and means in connection with said conduit for connecting a source of low pressure air thereto so that air will pass down the conduit onto the reflecting surface.

2. The anti-fogging dental mirror of claim 1 in which the conduit opposite the reflecting surface is knurled to form a roughened surface for ready handling and in which the end of the conduit has a reduced end section for easy fastening to a source of air.

3. An anti-fogging dental mirror comprising a reflecting surface, a frame for said reflecting surface supporting the same, a shank portion connected to said frame having a reduced end portion, a tubular conduit having a first bend and a second bend in substantially a Z shape which acts as a cheek retracting tool to provide increased working area in the mouth, the end of said tubular conduit defining a spray nozzle and being parallel to the shank and terminating directly in front of the reflecting surface at an angle with respect to said surface, aperture means through the tubular conduit surrounding said reduced end portion of the shank, fastening means in connection with said reduced end portion of the shank tightly securing the mirror in alignment with the nozzle end of the tubular conduit, and integral handle means on said tubular conduit for gripping the dental mirror.

References Cited in the file of this patent

UNITED STATES PATENTS

| | | |
|---|---|---|
| 1,660,870 | Fust | Feb. 28, 1928 |
| 1,905,633 | Feltham | Apr. 25, 1933 |
| 2,627,206 | Clark | Feb. 3, 1953 |
| 2,907,110 | O'Hara | Oct. 6, 1959 |